Sept. 6, 1938.  G. A. WHITE  2,129,612
PHONOGRAPH
Filed July 14, 1934  4 Sheets-Sheet 1

WITNESS:

INVENTOR
George A. White
BY
ATTORNEYS

Sept. 6, 1938.  G. A. WHITE  2,129,612

PHONOGRAPH

Filed July 14, 1934  4 Sheets-Sheet 2

WITNESS:

INVENTOR
George A. White
BY
ATTORNEYS

Sept. 6, 1938.     G. A. WHITE     2,129,612
PHONOGRAPH
Filed July 14, 1934     4 Sheets-Sheet 4
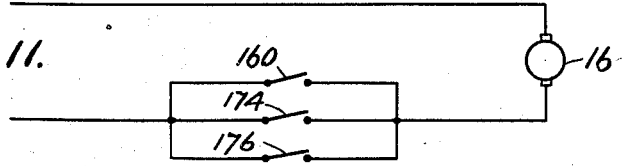
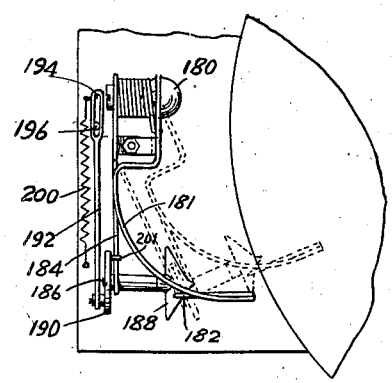
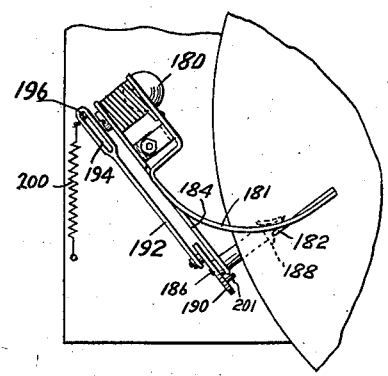
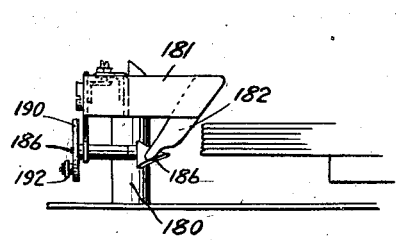
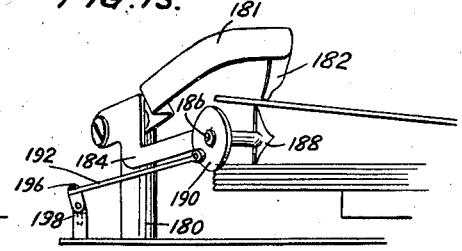
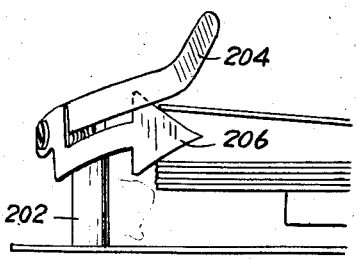
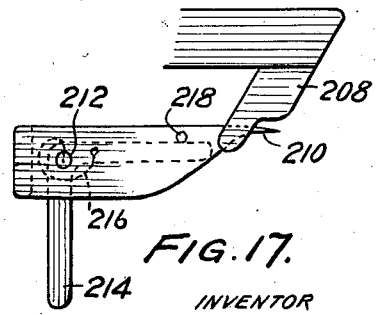
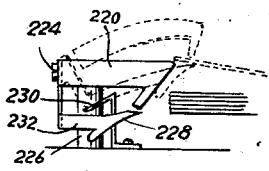
INVENTOR
George A. White
BY
ATTORNEYS
WITNESS:

Patented Sept. 6, 1938

2,129,612

UNITED STATES PATENT OFFICE 2,129,612

PHONOGRAPH

George A. White, Philadelphia, Pa., assignor to Lloyd H. Smith, Houston, Tex.

Application July 14, 1934, Serial No. 735,118

7 Claims. (Cl. 274—10)

This invention relates to a phonograph and particularly to a phonograph embodying mechanism for automatically changing records.

The present invention is concerned primarily with a type of record changing mechanism of the character disclosed in my prior applications Ser. Nos. 462,456 and 537,353, filed June 20, 1930 and May 14, 1931, respectively.

In the last mentioned application there is disclosed a phonograph in which a plurality of records are stacked upon a turntable, and means for removing the records individually from the stack after they are played, said means comprising more particularly a device in the nature of a wedge adapted to penetrate between the uppermost record and the one lying immediately below it and arranged, by reaction upon the lower record, to be raised to force the uppermost record to a position clear of a pin extending through the records of the stack. One of the primary objects of the present invention is the provision of a somewhat similar record removing mechanism which is capable of removing records in a minimum of time and with a smooth, noiseless action, and the expenditure of very little time. The last characteristic of the mechanism of the present invention is particularly important in that there is not required for operation a motor any more powerful than that normally used for effecting rotation of the records during playing.

Further objects of the invention relate to the means for properly handling the tone arm so as to position it for playing successive records following removal of those previously played. The tone arm controlling mechanism is furthermore such that the tone arm will properly cooperate with different size records and may also be located readily in an inactive position so that free access may be had for forming a new stack of records upon the turntable.

Another object of the invention is the provision of means whereby an attempt to stop the operation of the mechanism will normally be ineffective if a record changing cycle is in progress. As a result of this feature of the invention, if the switch normally provided to break the motor circuit were opened while a record changing cycle is going on, the motor would continue to operate until the topmost record has been removed and the tone arm is repositioned to play the next record.

The apparatus of the present case resembles that of the last named prior application in that the record changing mechanism is ineffective to remove from the turntable the last record remaining from the stack. In the prior mechanism, however, manual intervention was necessary to prevent a continuous replaying of this last record. In accordance with the present invention, after the last record is played and an ineffective record changing cycle takes place, the phonograph is stopped. Means are provided, however, so that replaying of the last record may be effected, if desired, by manipulation of a switch during its first playing. Repetition of the playing of any other record of the stack may also be effected by rendering inoperative the record changing mechanism.

These and other objects of the invention relating particularly to details of construction will become apparent from the following description read in conjunction with the accompanying drawings, in which:

Fig. 11 is a wiring diagram illustrating the relationship of certain switches with the motor control circuit;

Figs. 12 and 13 are fragmentary plan views showing successive steps in the operation of a modified form of record changing mechanism;

Figs. 14 and 15 are elevations of the same showing the parts respectively in the positions illustrated in Figs. 12 and 13;

Fig. 16 is a fragmentary elevation of diagrammatic nature showing a further modified form of record changing elements;

Fig. 17 is a fragmentary elevation of similar nature showing another modified form of record changing elements; and Fig. 18 is a fragmentary elevation of a further modified form of record changing elements.

Figure 2:
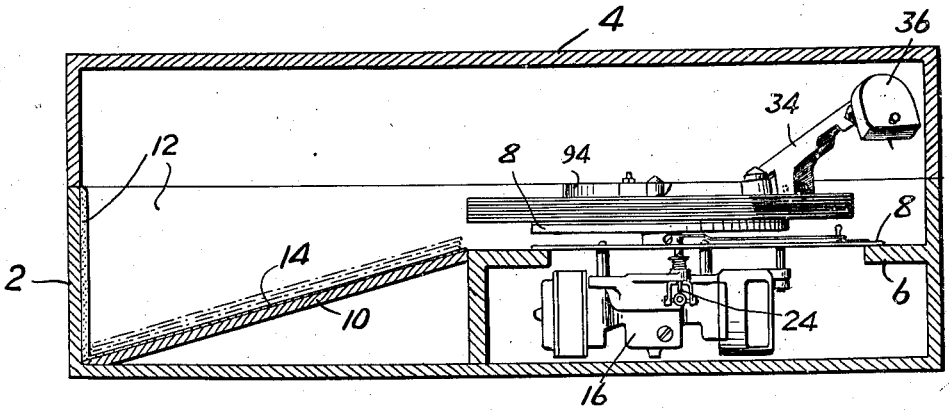
Fig. 2 is a vertical section showing the relationship of the phonograph turntable and associated parts to a preferred form of cabinet arranged for the reception of discharged records.

The phonograph is housed in a suitable cabinet conventionally illustrated at 2. If the phonograph is to form an individual unit, this cabinet may be of suitable small size. On the other hand, if, as is generally preferred, the phonograph is to be used in combination with a radio set, then a portion of the radio cabinet, preferably the upper portion, is used to form the phonograph housing. The cabinet, whatever form it may take, is preferably provided with a cover 4 which is of suitable height to clear the tone arm and pick-up unit when the same is held in an inoperative position as indicated in Fig. 2. Within the cabinet a suitable supporting arrangement is provided as shown at 6 for carrying the plate 8, on which are mounted all of the operating parts. This plate may form a closure for a housing, provided by the construction indicated at 6, for the motor and those parts of the mechanism which are desirably kept invisible.

At the side of the mechanism the cabinet is provided with a portion having a sloping bottom 10 for the reception of different records. As will be clear hereafter, the records are moved off the stack sidewise and consequently the upright walls located at the outer and rearward portions of the sloping bottom 10 are preferably covered with some soft material indicated at 12 which will prevent possible damage to the records as they are removed, the covering of the rearward portion being provided to prevent damage if the records should strike it. The bottom 10 may also be covered with some suitable soft material, indicated at 14, to prevent accidental damage to the lowermost record of the discarded stack. The later discarded records slide down the surface of the first to be discarded and are not subjected to possible damage, it being found that records may be slid over each other without any detrimental effect to the sound grooves.

For the purpose of both turning the record supporting table and also operating the record changing mechanism, there is provided a motor, indicated at 16, from which there extends the spindle 18 serving to rotate the turntable 20. This turntable may be connected to the shaft 18 in the usual fashion, rendering possible slippage in case of undue resistance to turning exerted upon the table. Such arrangements are usually provided for safety to prevent damage. The motor 16 is shown as of a type provided with a rotating sleeve surrounding the shaft 18, this rotating sleeve 22 being provided, in the present instance, with upwardly extending projections serving to act as pinion teeth. The motor is preferably of a synchronous or induction type of the character now commonly in use in phonographs, being capable of imparting to the turntable alternative speeds of 78 or 33⅓ R. P. M. The change in speed is accomplished through a suitable clutch control indicated at 24, operated by means of a lever 26 accessible above the plate 8. In the type of motor here illustrated, the shaft 18 has imparted to it either of the alternative speeds depending upon the type of record which is being played, the high speed of rotation being suitable for the ordinary records, while the low speed of rotation is used for the long-playing type of records. While the shaft 18 is capable of rotation at the two speeds, the sleeve 22 rotates constantly at the lower speed, which, in the case of a synchronous motor, is substantially exactly 33⅓ R. P. M., or, in the case of an induction motor whose speed may be varied through suitable governing mechanism, is approximately this same speed. The record changing mechanism is driven from the sleeve 22 and consequently operates to perform its cycle in approximately the same time irrespective of the type of record which is being played.

In the embodiment illustrated, the records are stacked on the turntable without any means clamping them downwardly, the weight of the records producing sufficient friction to provide proper rotation when the pressure of the needle on the topmost record is light as is now the case with modern pickups feeding into vacuum tube amplifiers. If, however, it is necessary to provide clamping because of excessive needle drag, a clamping arm may be brought down upon the stack to exert resilient pressure thereon, such arm being of the general type indicated in my prior applications, where, however, there are involved other functions for such arms.

Figure 8:
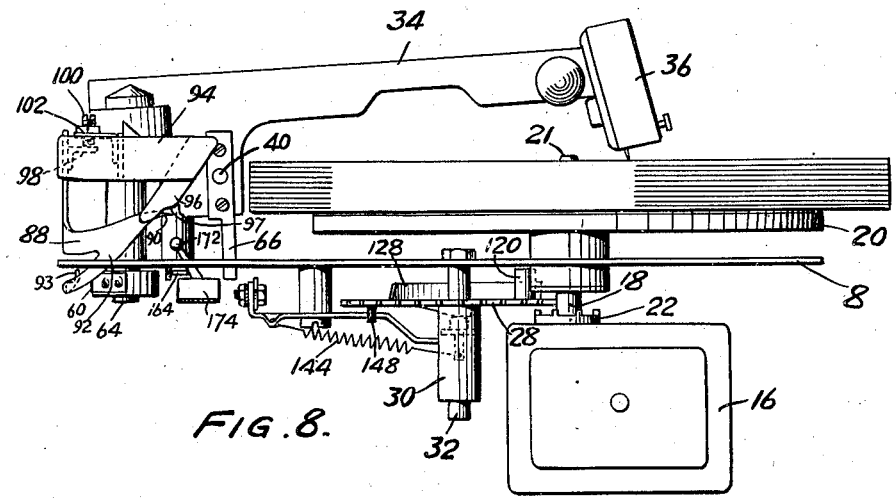
Fig. 8 is a side elevation of the mechanism with certain parts omitted.

The record changing mechanism is operated directly from a gear 28 provided with suitable teeth to mesh with the projections on the sleeve 22. One revolution of this gear 28 determines a single record changing cycle. The gear 28 is carried by a suitable hub 30 and is mounted for rotation about an axle sliding relatively to a pin 32 carried by the plate 8. Normally during the operation of the mechanism the gear 28 is maintained in an upper position out of mesh with the teeth on the sleeve 22, as illustrated in Fig. 8.

The tone arm 34 carries a pick-up 36 and is suitably counterbalanced and weighted by weights 38 located on the side of the pivot 40 opposite the pick-up 36. These counterweights and additional weights serve not only to cause the needle to exert the proper pressure upon the records, but also serve to increase the moment of inertia of the tone arm to such extent that the motion imparted to the needle by the sound grooves will not impart any imperceptible swaying to the pick-up unit 36 and consequently maximum effectiveness is attained. The pivot 40 is transversely mounted in a structure carried at the upper end of the tone arm. Spindle 42, which passes downwardly through a suitable bearing 44 secured to the plate 8, is hollow to provide for the passage therethrough of the lead wires 43 from the pick-up unit. These pass, in the usual fashion, to the amplifier, which may consist of the audio stages of a radio set with which the phonograph may be associated.

At its lower end the shaft 42 carries an arm 46 having a down-turned end 48 (which may be laterally adjustable) adapted to engage a tripping member hereafter described. There is secured to the arm 46 a pawl member 50 whose functions will be hereafter noted.

Swinging movements are imparted to the tone arm in a yielding fashion by connection, with an arm 52 carried thereby, of springs 54 and 56. The first mentioned spring 54 is a quite light one and is adapted merely to impart to the tone arm a slight clockwise force to cause it to enter the first portion of the groove of a record without, however, causing it to jump over the grooves. The spring is of such length that it is capable of exerting such force only when the needle is in the outer portion of a record groove. It is provided with a slotted or looped end 55 so that it exerts its efforts only to move the tone arm clockwise and does not prevent counterclockwise movements. The spring 56 is a substantially stronger one and is connected with an elongated link 58 engaging an opening in the end portion of a leaf-spring 60, which is secured to a hub 62 carried by an upright shaft 64 having a suitable bearing in the plate 8. The connections of this shaft are noted below.

Figure 1:
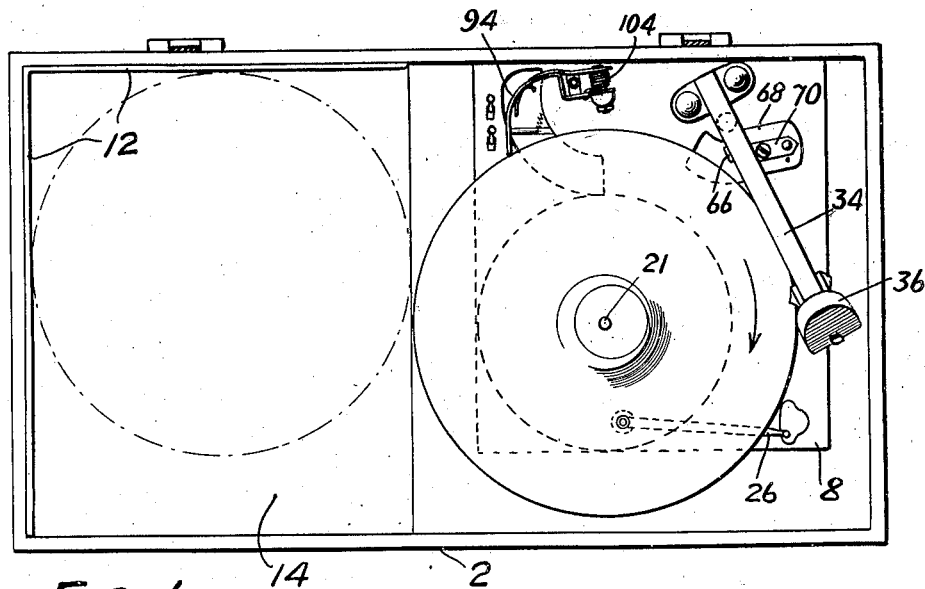
Fig. 1 is a plan view of the improved phonograph mechanism and a suitable cabinet therefor.
Figures 5, 6:
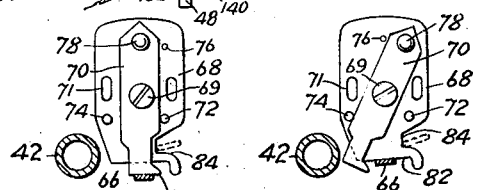
Figs. 5 and 6 are detailed plans with certain parts shown in section illustrating particularly the means for insuring the location of the tone arm in proper position at the beginning of records of various sizes.

The tone arm carries a downwardly extending element 66 which, by engagement with a suitable stop, is adapted to limit outward movements of the tone arm so as to cause or position it to enter the grooves of both 10 and 12 inch records. The plate 68 is secured to the plate 8 by screws passing through slots 71 whereby adjustment is provided, and overlies an arcuate slot providing clearance for the element 66. Pivoted on the plate 68 at 69 there is a lever 70 which is adapted to be adjusted between positions limited by stop pins 72 and 74, the lever 70 being yieldingly retained in its adjusted position by the provision of notches 76 in the upper surface of the plate 68, into which there is yieldingly projected a pin backed up by a spring housed within the hollow handle 78 secured to the lever 70. This detent means is of well known form and need not be described. It serves to prevent the accidental disturbance of the lever 70 from either of its limiting positions. The lever is provided with an outer end 80 which serves as one of alternative abutments for the element 66 as the tone arm is rocked counter-clockwise or outwardly to position above the outermost portion of the groove of a record, or preferably above the rim of the record outside such groove. The alternative stop is provided by the edge 82 of the plate 68. When the lever 70 is in the position indicated in Fig. 5, the tone arm will be limited in its outward movement at a position corresponding to the location of the needle above the rim of a 10-inch record. On the other hand, when the lever 70 is in the position indicated in Fig. 6, the limited position of the tone arm will be such that the needle would be above the rim of a 12-inch record. The plate 68 is further provided with a notch 84 adapted to receive the element 66 and hold the tone arm in an inoperative position as indicated in Figs. 1 and 2. It may be held in this position during transportation or when records are being placed upon the turntable. This position of the element is indicated in dotted lines in Figs. 5 and 6. The adjustment of plate 68 serves to provide the proper positioning of the needle at the beginning of a record.

A horizontal pivot pin 86 is provided at the upper end of the shaft 64 and serves for the support of members 88 and 94, which act upon the edges of records to effect their removal. These members are provided with nested hubs mounted on pivot pin 86. The element 88 has the form best indicated by reference to the figures of the drawing, and is in the nature of a wedge having a point 90 and a tail portion 92 which, at its extreme inner end, is turned inwardly and upwardly as indicated at 93. It will be noted that the element 88 has an upwardly convex edge behind point 90 on which the uppermost record rides during removal. The member 94 is provided at its forward end with a downwardly extending sloping portion 96 which is normally held in overlapping relationship with the point 90 of the wedge 88, as indicated in Fig. 8. This sloping portion 96 has a shouldered portion indicated at 97 to permit proper cooperation with records of slightly different diameters, as occur in the products of different record manufacturers. The distance between point 90 and shoulder 97 may be finely adjusted by reason of the provision of a bracket 98 carried by the member 88, with which contacts an adjustable screw 100 threaded into a bracket 102 carried by the member 94. A spring 104 wound about the outermost hub on the pivot pin 86 serves to urge the members 88 and 94 together to bring the set-screw 100 in contact with the bracket 98. The lower position of the members indicated in Fig. 8 is maintained only because of the fact that their weight is primarily at one side of the pivot 86 and is not due to any action of the spring 104. Their lowermost normal position indicated in Fig. 8 is limited by engagement of a suitable portion of the member 94 with a part of the upper end of the shaft 64. The tail portion 105 of the member 94 serves to permit the members 94 and 88 to be moved upwardly and remain in the position indicated in dotted lines in Fig. 4. As will be evident hereafter, when the parts are so positioned the changing mechanism may pass through a cycle without removing a record. This results in the repetition of playing of the topmost record.

The portions of the member 96 and tail 92 of wedge 88 which contact with the records are smoothly rounded, and it is found that even though these parts are made of metal no marks on the records result, in spite of the fact that during removal operations they wipe over the record surfaces. This may be ascribed to the fact that the records as now constructed are of abrasive character as compared with metals and are hence not scratched by contact with rounded portions of the metal parts. The rounded portions of these parts are of sufficient radius of curvature that in no case can they sink to any appreciable extent within the sound grooves.

A spring 106 reacts between a pin fixed to the plate 8 and a link 108 to bring into contact with a stop pin 110 an arm 112 to which the link is pivoted, which arm is secured to the shaft 64. The other end of the link 108 is pivoted to the arm 118 of a lever 114 pivoted upon a pin 116 carried by the plate 8. Arranged to cooperate with the lever 114 to move the same is a pin 120 secured to the gear 28 and extending upwardly therefrom.

Figure 7:
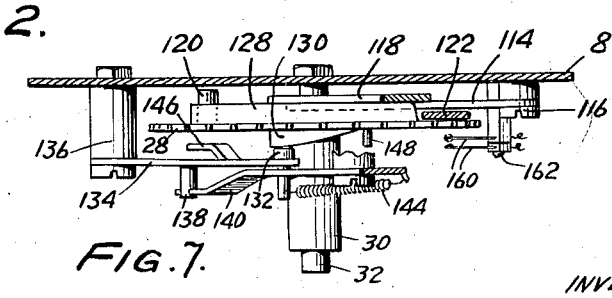
Fig. 7 is a vertical section taken on the plane indicated at 7—7 in Fig. 3, various parts being omitted for clearness.
Figure 3:
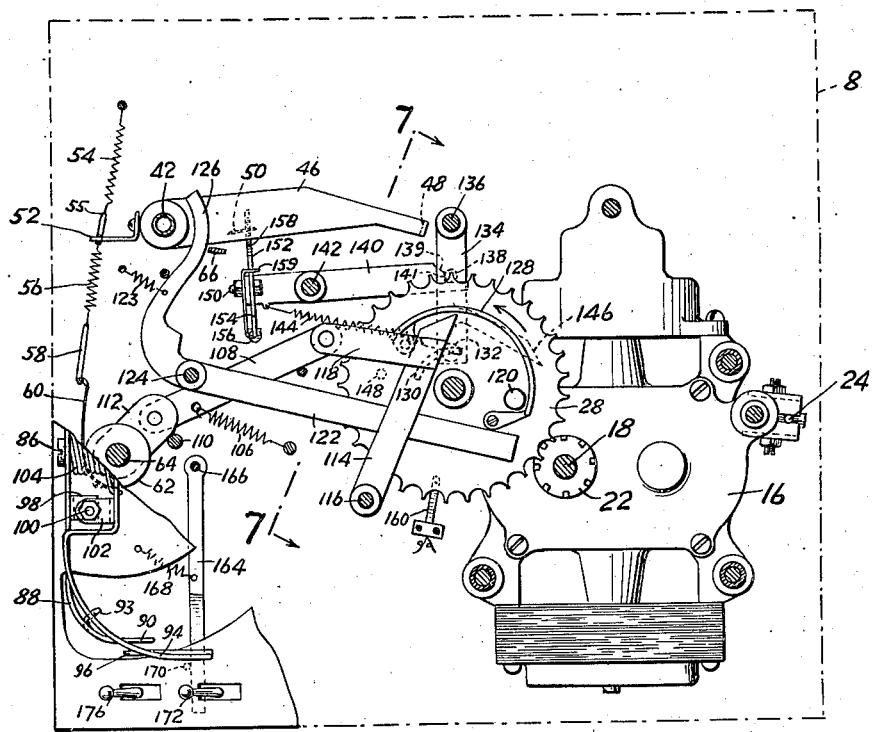
Fig. 3 is a horizontal section of the improved mechanism with various parts underneath the supporting plate viewed in plan, the major portion of this plate being removed and its outline alone indicated.

Underlying the lever 114 there is a lever 122 pivoted at 124 to the plate 8 and provided on the opposite side of the pivot with an arcuate portion 126 approximately concentric with the spindle 42 and adapted to engage the element 66 and, through such engagement, lift the tone arm to carry its needle away from the uppermost record. The lever 122 is arranged to be rocked by contact with a cam 128 in the form of an upright arcuate plate carried by the gear 28. For clarity, it may be pointed out that during operation the lever 114 is above the level of the cam 128 and is therefore not engaged thereby, the pin 120 extending substantially above this cam so as to engage the lever 114. The lever 122 is not engaged by the pin 120 inasmuch as it is at the level of the cam 128 which occupies a radial outer position relative to the pin. This relationship of parts will be best understood by reference to Figs. 3, 7 and 8.

On its under side the gear 28 carries a cam 130 which, when the record changing mechanism is in its static position, rests upon a pin 132 carried by an arm 134 pivoted upon a post 136 secured to the plate 8. It is this engagement of the pin 132 with the high part of the cam 130 which serves to normally maintain the gear 28 in an upper position out of mesh with the gear formed on the sleeve 22. The lever 134 carries a pin 138 which normally rests on a shoulder 141 provided, together with a sloping portion 139, at the end of a lever 140 pivoted at 142 to the plate 8 and normally urged in a counterclockwise direction, as viewed in plan, by a spring 144 which reacts between it and the lever 134, serving also to hold the pin 138 of the latter in the notch 141 in lever 140. The lever 134 has an arm extension 146 which is engageable by a downwardly extending pin 148 secured to the gear 28 to rock the lever 134 against the tension of spring 144 and restore it to its proper position.

Secured horizontally to the lever 140 is a rigid lever 152 having an extension 154 on the opposite side of the pivot, to which is connected a spring 156 normally urging the serrated portion 158 of the lever 152 upwardly so that it may be engaged with the pawl member 50, previously referred to as carried by the arm 46. The upward movement of 152 is suitably limited by stop 159 so that it will be normally engageable by the pawl member as the tone arm moves inwardly. The serrations 158 are in the form of fine teeth which point upwardly to the right as viewed in Fig. 4. The purpose of this will be made evident hereafter.

Switch contacts 160 are carried by a post 162 and are located below the gear 28 so that when the gear occupies its upper position they are not engaged thereby and remain out of contact with each other, but when the gear 28 drops into mesh with the gear sleeve 22, the contacts 160 are engaged with each other to close the circuit through the motor 16, as indicated in the diagram of Fig. 11.

A lever 164 pivoted at 166 and urged clockwise, as viewed in plan, by a spring 168 into contact with a stop 170, extends behind the lever 172 of a conventional snap switch, indicated at 174, which is in the motor circuit in parallel with the switch 160. Another snap switch 176 is in parallel with switches 160 and 174. By reason of the parallel connections, it will be obvious that when any of the switches is closed, the motor will be energized.

The lever 164 is so formed as to be engaged by the inward extension 93 of the tail 92 of the wedge 88 when the wedge moves in without riding up on any record, as is the case when only one record remains on the turntable at the initiation of a record removing cycle. This engagement of the extension 93 with the lever 164 is adapted to move the lever 172 of switch 174 to its open position. The switch 172 is that normally adapted to be manually manipulated to start and stop the operations of the phonograph. The switch 176 is merely provided for the purpose of repeating the playing of the last record. The switch 160, as will be noted hereafter, is designed to maintain the motor running in spite of the opening of either switch 174 or 176 during a record changing cycle, which is characterized by the lowered position of the gear 28.

During the playing of a record, the parts occupy the positions illustrated particularly in Figs. 3, 4, 7 and 8. Under these circumstances, since the gear 28 is held in raised position, the switch 160 remains open while the switch 172 is closed to secure continued operation of the motor 16. The switch 176 will, in general, be open.

There are in general use at the present time two types of records with respect to the condition of the end portion of the groove. These two types of records are adapted to function in different ways to produce automatic stopping of conventional phonographs. In one type of record, the end portion of the groove is approximately circular but eccentric to the hole in the center of the record. The result of this construction is to produce an oscillation of the tone arm when it reaches the end of the groove. In this type of record the distance from the center of the closest portion of the end of the groove may vary substantially, depending upon the extent of groove taken up by the recording. In the other type of record, the final portion of the groove is a circle concentric to the hole. In this case, however, the circle is of relatively small diameter and is arranged to insure a movement of the tone arm to an inner position beyond that ever attained by the portion of the groove in which recording has taken place.

The construction herein described is such that removal of a topmost record occurs when the needle enters the inner portion of a groove of either type. If the eccentric type of end groove is provided, then initiation of the record change is effected through the coaction of the pawl 50 with the serrations 158 on the lever 152. As the tone arm moves inwardly, the pawl 50 rides freely over these serrations and, since the resultant friction tends to press the lever 140 against the pin 138, nothing occurs. However, as soon as the motion of the tone arm is reversed, the pawl 50 locks into one of the serrations of lever 152 and rocks the lever 140 clockwise, as viewed in plan, to cause it to disengage the pin 138.

In the case of the latter type of record, the same release of the pin 138 is achieved when the downward projection 48 of lever 46 strikes and moves clockwise the lever 140.

As a result of either type of operation, the pin 138 is released from shoulder 141 and the lever 134 rides clockwise under the action of spring 144, moving the pin 132 from beneath the high portion of cam 130. The gear 28 then drops of its own weight into mesh with the pinion formed on the sleeve 22 and rotation of the gear commences, initiating the removal cycle. As the gear 28 drops, the switch 160 is closed so that even though the switch 172 may be opened manually, the removal operation will continue until its end.

As the pin 138 moves with the lever 134, it engages the sloping cam face 139 of lever 140 and rocks the lever to an extent causing serrations 158 to clear the inner end of pawl 50. The tone arm is then free to swing in either direction without causing contact between pawl 50 and serrations 158.

The first operation which now occurs is the engagement of the cam 128 with the lever 122, which is rocked against the tension of the spring 123 and lifts the tone arm through engagement with the lever 66. (The spring 123 may be omitted.) The arrangement is such that the tone arm is rapidly lifted by the end of the cam 128 and is thereafter held at a substantially constant elevation for a considerable portion of the removal cycle.

Immediately after the tone arm is lifted, the pin 120 engages the lever 114 producing, through the link 108, a counter-clockwise oscillation of the shaft 64 and the members 88 and 94 which it carries. During this oscillation of the shaft 64, tension is applied to the link 58 and spring 56 which, during the lifting of a record, serve to rotate the tone arm counter-clockwise to a position determined by the location of the lever 70. If this lever occupies the position shown in Fig. 5, the tone arm is arrested at a position which will bring its needle above the edge portion of a ten-inch record. If, on the other hand, the parts are positioned as in Fig. 6, the needle will be brought to a position above the edge of a twelve-inch record.

Figure 9:
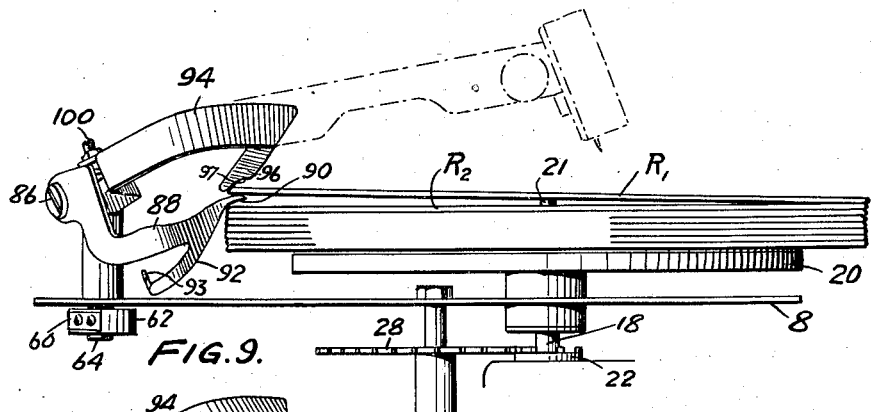
Figs. 9 and 10 are views similar to Fig. 8 but of a diagrammatic nature indicating various steps in the removal of a played record.
Figure 10:
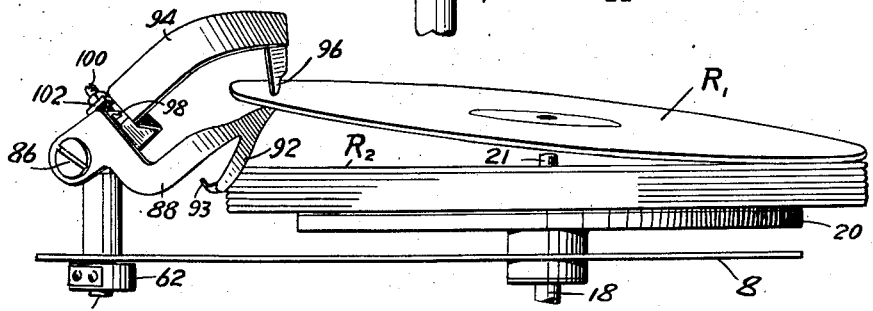

In the meantime, the member 94 will have moved to a position where its sloping forward edge 96 will engage the periphery of the topmost record. As it moves farther inwardly, it is cammed upwardly, lifting with it the wedge 88 by reason of the spring connection 104, the point 90 of this wedge occupying a fixed position relative to the member 94 because of the setting of the screw 100. The setting is such that when the point 90 reaches the periphery of the records it will be positioned by its relationship to the sloping edge 96 at a level such that further inward movement will cause it to penetrate between the uppermost record, designated R1, and the next record, R2. These records have rounded edges and at the time the point 90 reaches them they are rotating so that the penetration by point 90 between the records readily takes place. Due to the provision of shoulder 97, there is a hesitation in the rise for a small part of the inward movement whereby provision is made for proper cooperation between records of slightly different diameter. Fig. 9 represents the condition of the parts immediately after penetration has taken place. The relationships between the members 88 and 94 can now no longer be maintained and consequently 94 yields upwardly relative to 88 as permitted by the spring 104. As further arcuate movement occurs, the lower portion of 96 passes in an arc over the top of the uppermost record R1, while the tail 92 of the wedge 88 ridges up over the edge of the record R2, and by reason of the wedging action, lifts the record R1 free from the upper end of pin 21. The continued movement of the wedge 88 may carry the lowermost portion of the tail 92 over the surface of the record R2. Consequently it is necessary for the metal to be carefully rounded at the bottom of the slope 96 above the point 90 and at the lower end of the tail portion 92 of the wedge. It will be noted that the top of the point 90 is made convex upwardly so that as the wedge rides inwardly and the uppermost record slopes, there will be presented to the undersurface of the record R1 only a smooth surface which will not cause scratching.

As soon as the record R1 clears the pin 21, it is carried from the stack by the rotation of the lower record, swinging about the upper edge of wedge 92 behind the point 90 or lower portion of slope 96 as a pivot so that it is discharged into the pocket provided for its reception, in general contacting with the walls, which are covered by the soft material indicated at 12.

The actions of the members 88, and 94 are somewhat different, depending upon whether ten or twelve inch records are being played or the height of the topmost record. The adjustment of the point 90, however, is not critical, and it is found that with a single adjustment records will be properly removed irrespective of their sizes or vertical heights above the table 20. In the case of the twelve-inch records, there will, of course, be a greater sweep of these parts across the records, but this is of no consequence and does not interfere with the proper operation.

During the inward movement of the wedge 88, it will be noted that it is lifted as soon as the sloping portion 96 of member 94 engages a record. The lever 164 is positioned so that it will not be engaged by the extension 93 of the tail 92 when the member 92 rides over a record. As described below, the action is different when there is only one record remaining on the table.

As the pin 120 recedes from the lever 114, the lever follows it until the arm 112 engages the pin 110. During this time the members 88 and 94 withdraw from the stack of records and the flexible strip 60 rides into the link 58, relieving all tension from the spring 56. As was noted above, the spring 54 is a very light one and is insufficient to cause the tone arm to move clockwise so long as the element 66 is in frictional engagement with the arcuate portion 126 of the lever 122. In spite, therefore, of the relief of tension of spring 56, the pickup needle retains its position above the edge portion of the now topmost record.

The arm 46 will, in the meantime, have been swung counterclockwise to a position such that not only does the downturned end 48 pass out of possible contact with the lever 140, but the ratchet 50 will have left possible engagement with the serrated portion of the lever 152. The lever 140 will accordingly have swung counter-clockwise under the action of spring 144 to such extent as to cause it to engage the pin 138 which is now substantially to the left of the position indicated in Fig. 3 with the pin 132 out of the path of the cam 130. The pin 148 will now engage extension 146 of lever 134 and rock this lever counter-clockwise to such extent that the pin 138 will pass the slope 139 and notch 141 and the lever 140 will ride counter-clockwise to a position wherein its notched portion engages the pin 138. As the pin 148 then leaves engagement with the extension 146, the lever 134 will be held in its original position in notch 141 with the pin 132 located in position to engage the cam 130 as it approaches.

As the gear 28 approaches the end of its revolution, the cam 128 disengages the lever 122, permitting the tone arm to settle slowly so that its needle engages the edge portion of the topmost record between its periphery and the beginning of the groove. The light spring 54 which was heretofore exerting insufficient tension to move the tone arm because of the friction between 66 and 126, may now urge the tone arm inwardly as the record revolves and the needle rides on the smooth portion of the edge. This action continues until the needle drops in the groove. The light tension of the spring 54 is insufficient to cause the needle to jump from the groove into an adjacent groove, but insures merely such slight movement of the tone arm as will cause a proper entry of the needle into the uppermost turn of the groove.

Following this action the gear 28 reaches a position in which the cam 130 rides over the pin 132. The gear is so disengaged from the driving pinion and comes to rest in its initial position. The playing of the topmost record then takes place.

The continued closure of switch 168 insures completion of the record changing cycle even though the switch 172 may have been opened. If switch 172 was opened during the cycle, then as soon as the gear is lifted switch 160 is opened and the motor stops. At this time the needle will be in the outermost portion of the record groove, being in general in that portion of the groove in which no recording has taken place so that playing of the record will not begin. It is desirable to prevent stopping of operation during the record changing cycle since during the cycle the motor is overloaded and may not be able to start if, for example, the wedge is between records or the pickup is being raised. The induction motors ordinarily used do not have large starting torques and may under such conditions fail to start, although well able to take care of the load when operating near normal speed.

The above described operation is conditioned upon the presence of at least two records upon the table 20 when the record changing cycle begins. If only one record remains on the table, there will be no record below it upon which the wedge 88 may ride, the table 20 having a diameter substantially less than the diameter of a ten-inch record, so that it will not be engaged by the wedge 88 upon its inward arcuate movement. As a consequence, when only one record remains on the table, the point 90 of the wedge will ride under it and will not tend to lift the record at all. Consequently the cycle of operation takes place and the tone arm will be taken back to the beginning of this last record but no removal of the record will occur. In the arrangement shown, however, there does occur one additional operation, namely, the automatic opening of the main switch 172 by the engagement of the extension 93 of the tail 92 with the lever 164. This occurs because the wedge 88 is not now lifted and a downwardly extending portion of the lever 134 is in position to be engaged by the extension 93. The position of the lever 164 is such that as the extreme movement of the shaft 64 occurs, the switch arm 172 is moved past midposition and snaps to open the switch 174. It will be noted that this opening occurs during the record-changing cycle, at which time the switch 160 is closed in parallel with 174. The motor accordingly is not immediately stopped, but continues to operate until the end of the cycle. The machine then stops with the needle in the outer portion of the groove of the last record.

Figure 4:
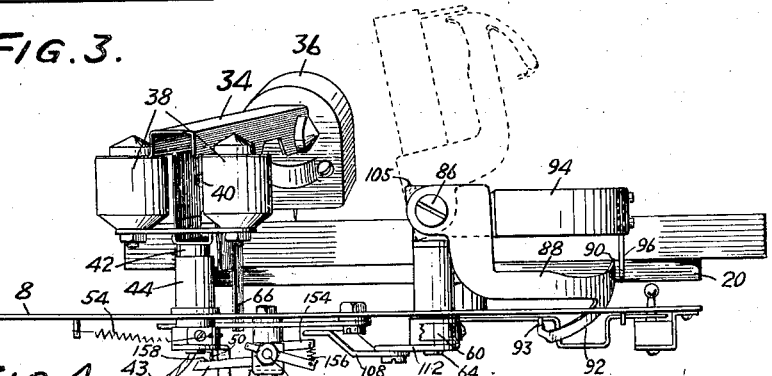
Fig. 4 is a rear elevation of the mechanism, certain parts being omitted for clearness.

The repetition of the playing of any record may be effected merely by swinging the members 94 and 88 to the position indicated in dotted lines in Fig. 4. At the end of a record, the tone arm will then be moved back to the beginning of the record but no removal of the record will occur. The repetition of the last record can, of course, be accomplished in the same fashion. It may be desired, however, to have a series of records played without repetition but to have the last record played automatically repeatedly until such time as the machine is manually stopped. In such case the members 94 and 88 may be let down in their normal record removing position but the switch 176 may be closed. The machine will then discard all of the records until the last, whereupon the last will be repeatedly played, until some manual intervention is made.

Manual discard of any record may be accomplished merely by manually lifting the tone arm, moving it inwardly until the pawl 50 catches the serrated portion of the lever 152 and then moving it outwardly, or by moving it inwardly until 48 engages 140, whereupon the record changing mechanism may be tripped into action. Alternatively, if desired, a pusher may be provided to engage and trip the lever 140. Such type of operation is indicated in my prior application Ser. No. 537,353. An alternative form of wedge arrangement is indicated in Figs. 12 to 15, inclusive. In this arrangement, an upright shaft 180, corresponding to 64, supports an arm 181 corresponding to 94 and having a sloping forward edge 182, and a second arm 184 corresponding to 88, the two arms being urged towards each other by a suitable spring and being adjustable in their relative relationship by a set-screw, as in the previous modification. In this case, however, there is journalled in the outer end of the arm 184 a shaft 186 which carries a double wedge indicated at 188 and a crank arm or disc 190, a pin on which is connected with a link 192 which is slotted at its opposite end, as indicated at 134, to embrace a pin 196 which may have a universal mounting, as indicated at 198. A spring 200 normally urges the link 192 forwardly as viewed in Fig. 12, to cause the wedge to assume a substantially horizontal position as determined by engagement of a pin 201 with the lever 184. In this arrangement, due to the slotted link connection, as the shaft 180 oscillates the wedge moves horizontally, guided by the slope 182 into a position between the uppermost and next records. As the motion continues further, the link 192 is arrested by the pin 196 and consequently there is produced a rocking of the shaft 186 causing the wedge to assume an upright position, thereby substantially raising the uppermost record relative to the lowermost one. The removal then takes place in a fashion similar to that previously described. This arrangement is adapted for use where it is desired to conserve space behind the record stack.

Considerable variation in details of this arrangement is possible: for example, a rounded and pointed rod having a laterally projecting pin may replace wedge 188 and rocking may be effected by a cam.

Another alternative form of arrangement desired to conserve space is illustrated in Fig. 16, this arrangement being similar to the first described above, consisting of a shaft 202 similar to 64, a guide arm 204 similar to 94, and a wedge carried by an arm corresponding to 88, the wedge 206 being double-edged as indicated in this figure so that substantial rise of the edge of the topmost record is produced for relatively level angular travel. The primary objection to this type of arrangement is that a substantial amount of effort must be exerted by the motor to secure its operation. If, however, a motor of ample size is provided, it may be used. In both the last-named modifications some rise of the last record may occur, insufficient, however, to cause it to clear the pin.

Still another modification is shown in Fig. 17, in which the guide 208 of the same form as the guides heretofore described, cooperates to lift a wedge 210 which has relatively little vertical extent. Pivoted on this wedge at 212 is a bellcrank 214 held upwardly by a spring 216 in engagement with a stop pin 218. As the wedge moves inwardly, the depending arm of 214 engages the edge of the second record and the normally horizontal arm rocks downwardly to engage this record producing a rapid rise of the wedge to lift the topmost record.

A further modification is illustrated in Fig. 18. In this case the guide 220 is pivoted on a pin 224 extending laterally over the shaft 226 corresponding to the shaft 42 of the first modification. The pin 224 also supports the wedge 228. Positioned adjacent the wedge there is located a sloping member 230 which is adapted to act as a cam upon the lower edge of the arm 232 which carries the wedge. This arrangement is designed to effect removal of the topmost record without producing a drag upon the lowermost record at the instant the topmost record is about to be turned off. This action is effected by so arranging the cam 230 that after the wedge 228, guided by the member 220 as in the preceding modification, has penetrated to a substantial distance within the periphery of the records and has risen by reaction between the uppermost records to a predetermined height, the lower edge of the arm 232 will engage the top of the cam slope 230 whereupon the cam will cause a more rapid rise of the wedge than is occasioned by its action on the underlying record, so that it will clear the underlying record, leaving it free from frictional restraint and hence rotating at full speed when the uppermost record is moved clear of the pin. While a slight additional load is created due to the rapid lift, this is balanced by elimination of friction between the wedge of the former modification and the edge of the record, so that the load on the motor is about the same as in the other cases. There is no possibility that failure of removal will occur due to stopping of the underlying record. Motion of this record is, of course, necesary to throw off the topmost one. It will be noted that the lower edge of the cam 230 lies above the arm 232 when the wedge is in its lowermost position. This is necessary to prevent lifting off of the last record or possible jamming. When only one record remains on the turntable, the wedge will move under it as in the case of the preceding modifications, moving also under the cam 230 so as not to engage the same. The arrangement is such that the cam 230 cannot be engaged, in any event, until the wedge has risen to such height, even though only two records remain on the table, that its lower edge will strike the sloping part of the cam and hence be raised thereby without jamming. It may be noted that this arrangement provides for a substantial rise which may be gradual even though no excessively long tail portion is provided on the wedge.

It will be understood that the switching arrangement herein described need not be provided in the elaborate form shown, but simpler combinations may be used involving, for example, only the main switch and the switch preventing stopping of operation during a record changing cycle. Alternatively the main switch alone may be used so that the phonograph may be stopped during a record changing cycle. The motor may exert a sufficient starting torque, if properly designed, to continue operation even though stoppage occurs during the changing cycle; even, however, if the motor has insufficient starting torque to start from rest during the changing cycle, the operation may be manually caused to take place by imparting a push to the turntable or by, for example, momentarily reducing the load by raising the tone arm or wedge, depending upon the part of the cycle in which stoppage occurred.

It is obvious that other variations may be made in the embodiments of the invention without departing from the scope thereof as defined in the following claims.

What I claim and desire to protect by Letters Patent is:

1. A phonograph including a pin arranged with its free end uppermost, a turntable for supporting a plurality of records arranged in a stack for rotation about the axis of the pin, and means for raising the topmost record relatively to the next record to clear the pin, said last named means including a member movable to penetrate between the two uppermost records and a cam effective to lift said member, the member being arranged in the initial part of its penetrating movement to engage the underlying record and at the end of such movement to be acted upon by the cam to clear the underlying record, said member being arranged to clear said cam unless more than one record remains on the turntable.

2. A phonograph including a pin arranged with its free end uppermost, a turntable maintained at a fixed height for supporting a plurality of records arranged in a stack for rotation about the axis of the pin, and means for raising the topmost record relatively to the next record to clear the pin, said last named means including a member penetrating between the two uppermost records and turning about an axis extending in the direction of its penetrating movement.

3. A phonograph including a pin arranged with its free end uppermost, a turntable maintained at a fixed height for supporting a plurality of records arranged in a stack for rotation about the axis of the pin, means for raising the topmost record relatively to the next record to clear the pin, said last named means including a member penetrating between the two uppermost records and turning about an axis extending in the direction of its penetrating movement, and means for effecting said turning movement by the continued penetrating movement of the member.

4. A phonograph including a pin arranged with its free end uppermost, a turntable maintained at a fixed height for supporting a plurality of records arranged in a stack for rotation about the axis of the pin, and means for raising the topmost record relatively to the next record to clear the pin, said last named means including a member penetrating between the two uppermost records, and an element movable transversely to the stack of records engaging the edge of a record and movable upwardly by its transverse movement during such engagement to raise the penetrating member to lift the topmost record.

5. A phonograph including a pin arranged with its free end uppermost, a turntable for supporting a plurality of records arranged in a stack for rotation about the axis of the pin, and means for raising the topmost record relatively to the next record to clear the pin, said last named means including a member movable to penetrate between the two uppermost records and a cam effective to lift said member, the member being arranged in the initial part of its penetrating movement to engage the underlying record and be lifted thereby and at the end of such movement to ride upon the cam to clear the underlying record.

6. A phonograph including a pin arranged with its free end uppermost, a turntable maintained at a fixed height for supporting a plurality of records arranged in a stack for rotation about the axis of the pin, means for raising the topmost record relatively to the next record to clear the pin, said last named means including a member penetrating between, engaging, and thereby reacting between, the two uppermost records to progressively separate them after penetration occurs, said reaction continuing throughout the separation, and means engaging the uppermost record and connected to the penetrating member for guiding said penetrating member between the records, said guiding means being designed to raise the penetrating member through heights equivalent to the sum of thicknesses of a plurality of records.

7. A phonograph including a pin arranged with its free end uppermost, a turntable maintained at a fixed height for supporting a plurality of records arranged in a stack for rotation about the axis of the pin, means for raising the topmost record relatively to the next record to clear the pin, said last named means including a member penetrating between, engaging, and thereby reacting between, the two uppermost records to progressively separate them after penetration occurs, said reaction continuing throughout the separation, and means engaging the uppermost record and connected to the penetrating member for guiding said penetrating member between the records, said guiding means being designed to initially raise the penetrating member and then, while the penetrating member maintains a substantially fixed height, guide it to move further inwardly, whereby entry is properly effected in cases of records of different diameters.

GEORGE A. WHITE.